United States Patent [19]

Bagley

[11] Patent Number: 5,344,362

[45] Date of Patent: Sep. 6, 1994

[54] INTERNAL FAN HOUSE FOR CURVET BUILDING

[75] Inventor: Terrence F. Bagley, Rexburg, Id.

[73] Assignee: Teton West Construction, Inc., Rexburg, Id.

[21] Appl. No.: 813,460

[22] Filed: Dec. 26, 1991

[51] Int. Cl.$^5$ ............................................. F24F 13/00
[52] U.S. Cl. ..................................... 454/180; 454/182
[58] Field of Search ............... 454/174, 175, 179, 180, 454/181, 182

[56] References Cited

U.S. PATENT DOCUMENTS

| | | | |
|---|---|---|---|
| 1,319,978 | 10/1919 | Taylor | 454/180 |
| 2,196,391 | 4/1940 | Gronert | 454/180 |
| 2,590,416 | 3/1952 | Johnson | 454/180 |
| 3,694,925 | 10/1972 | Coyle et al. | 454/91 X |
| 3,921,508 | 11/1975 | Merson | 454/180 |

Primary Examiner—Harold Joyce
Attorney, Agent, or Firm—Jacobson, Price, Holman & Stern

[57] ABSTRACT

A structural arrangement in which a fan house is constructed to accommodate an evaporative cell fan and other related equipment which may be used to provide conditioned air with the fan house being oriented internally of or within the confines of a curvet potato storage building to reduce the overall cost of the building and to provide an assembly that is easier to design from an engineering standpoint than an external fan house for a curvet (Quonset) building or air plenum. The fan and evaporative cell may be arranged in various relationships to each other and with an air plenum and vent pipe arrangement with the essential arrangement being the provision of the fan house being oriented within the interior of the curvet style building.

3 Claims, 3 Drawing Sheets

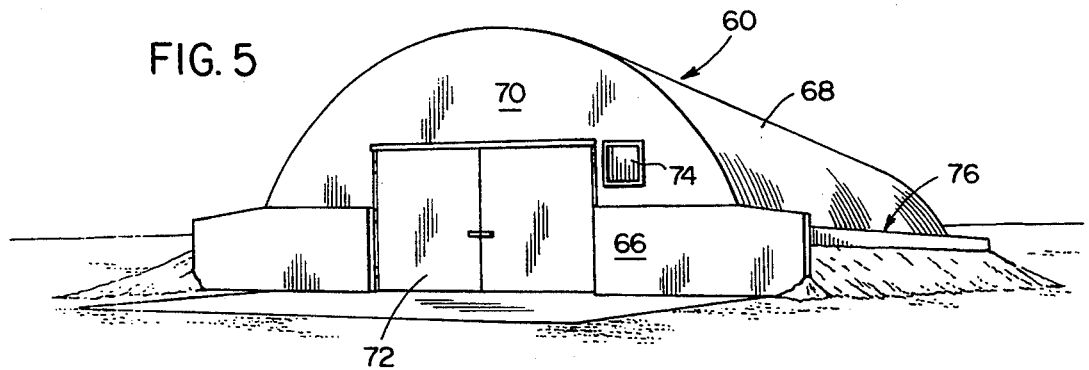
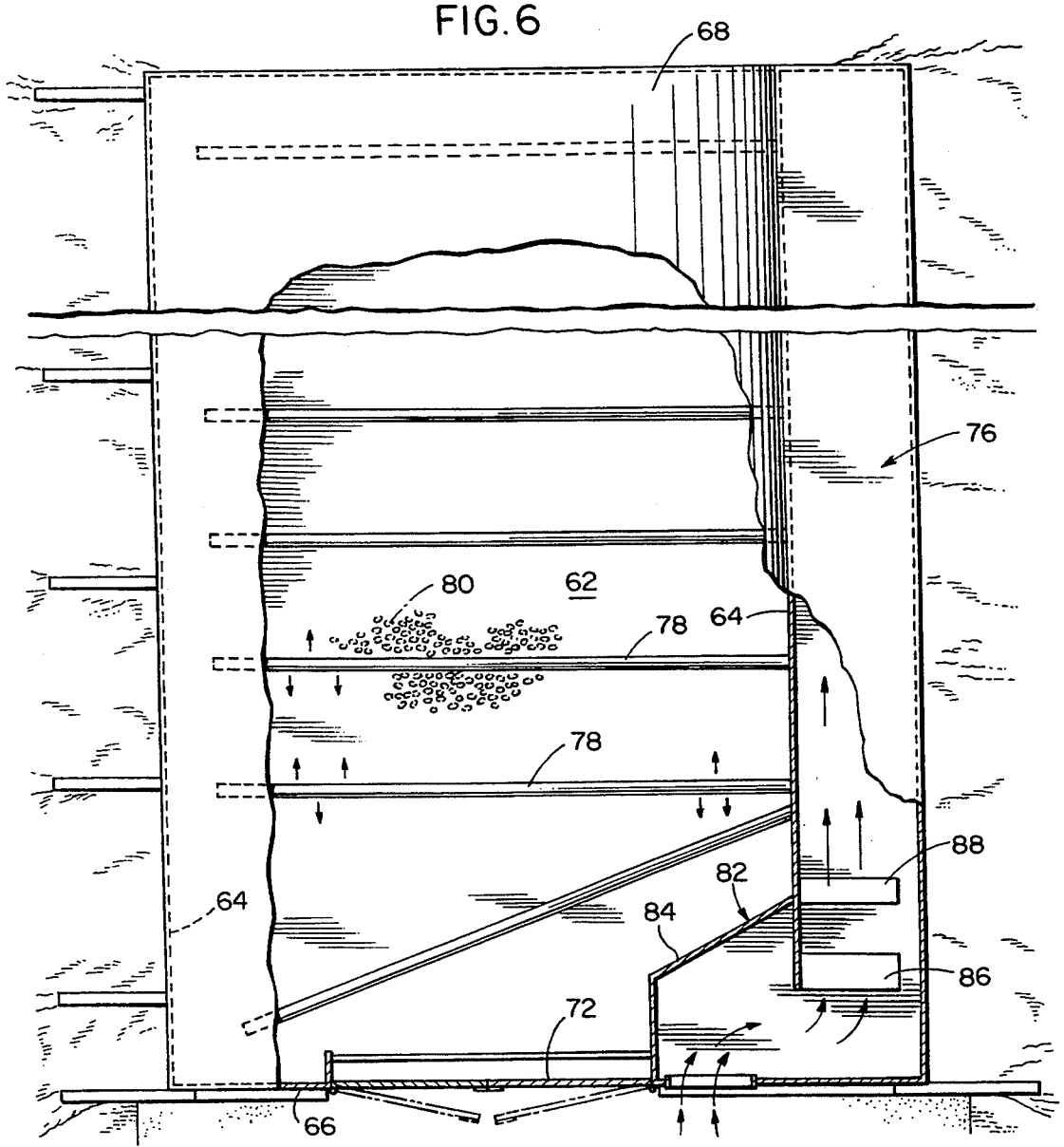

INTERNAL FAN HOUSE FOR CURVET BUILDING

BACKGROUND OF THE INVENTION

1. Field of the Invention

The present invention generally relates to potato storage buildings in which large quantities of potatoes are stored with vent pipes positioned below the potatoes introducing conditioned air into the stored potatoes. More specifically, the present invention involves a structural arrangement in which a fan house is constructed to accommodate an evaporative cell, fan and other related equipment which may be used to provide conditioned air with the fan house being oriented internally of or within the confines of a curvet (Quonset) building or air plenum to reduce the overall cost of the building and to provide an assembly that is easier to design from an engineering standpoint than an external fan house for a curvet (Quonset) style building. The fan and evaporative cell may be arranged in various relationships to each other and with an air plenum and vent pipe arrangement with the essential arrangement being the provision of the fan house within the interior of the curvet style building.

2. Description of the Prior Art

Commercial or seed potatoes are conventionally stored in buildings or cellars with the quantity of the stored potatoes typically ranging anywhere from 10,000 hundred weight to 500,000 hundred weight. When storing such potatoes, vent pipes of relatively large diameter having air discharge holes are placed along the floor of the storage building so that conditioned air having desired temperature and moisture characteristics passes through the vent pipes and is discharged through the holes into the stored potatoes. Various types of buildings are employed but usually, an air plenum extends throughout the length of the building and connects to the vent pipes. Usually, the volume of air passing through the air plenum and vent pipes ranges between 10 cu. ft. per ton of potatoes per minute to 20 cu. ft. per ton of potatoes per minute. The moisture content can be ambient moisture or added moisture up to approximately 96% humidity. The air plenum can be typically located on the outside of the building or can be incorporated into the interior of the building. A fan and evaporative cell are located in a fan house which is the area designated to receive the fan and evaporative cell and one or more humidifiers and controls. The evaporative cells used are typically constructed of cellulose paper impregnated with insoluble anti-rot salts and rigidifying saturants and constructed for evaporative cooling with water dripping down through the cell and air being blown through the cell to pick up the moisture and to provide evaporative cooling. The cells may be on the order of 1 ft. thick and may range between 20 sq. ft. of cooling surface area up to over 300 sq. ft. of surface area. The buildings may be of various constructions such as straight wall buildings, slope wall buildings, dirt/pole buildings and curvet style buildings. Essential factors in proper storage of potatoes is humidity and temperature control which is greatly aided by the use of evaporative cells which assist in the introduction of humidity and the evaporative cooling process assists in temperature control since the evaporative cell can cool air supplied to the vent pipes from 10° to 15° depending on the temperature and humidity of ambient air. The introduction of conditioned air into the bottom areas of the stored potatoes keep the potatoes from shrinking and keeps the potatoes cool since the conditioned air is circulated up through the potato pile and then either exhausted out exhaust vents or recirculated back through the evaporative cell and fan.

U.S. Pat. No. 3,921,508 to Merson discloses potato storage buildings of arcuate or curvet style in which an air plenum extends longitudinally between two adjacent buildings with an external fan house being provided at one end of the buildings for circulating air through the plenum and potatoes.

The prior art in this field of endeavor does not disclose an internal fan house constructed to accommodate an evaporative cell unit and a fan unit within the confines of a curvet style building or air plenum with it being noted that the Merson patent discloses a fan house projecting outwardly from the building.

SUMMARY OF THE INVENTION

An object of the present invention is to provide an internal fan house for a fan and evaporative cell for a curvet style potato storage building in which the fan house is located completely within the interior of the building and adjacent air plenum rather than projecting from the front of the building thereby reducing the cost of the fan house and related equipment and providing a fan house that is more easily engineered to be compatible with the peripheral wall and roof components of a curvet style building as compared to effectively constructing and designing an exterior fan house for a curvet style building.

Another object of the invention is to provide an internal fan house to accommodate a fan and evaporative cell together with other related equipment and controls located totally within the confines of a curvet style building to enable alternative arrangements of the components in the fan house or air plenum and enabling alternative arrangements of air plenum and vent pipes for optimum association with a curvet style building.

A further object of the invention is to provide an internal fan house oriented within the internal confines of a curvet style potato storage building in which the fan house includes an air inlet located in the external periphery of the building and a discharge located in or forming part of an air plenum extending along the building and communicated with perforated air discharge pipes located in the lower portion of the stored potatoes for maintaining humidity and temperature control of the stored potatoes to maintain them in ideal condition.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a perspective view of a single curvet building incorporating the fan house of this invention.

FIG. 6 is a top plan layout of the building shown in FIG. 5.

DESCRIPTION OF THE PREFERRED EMBODIMENT

Figure 1:
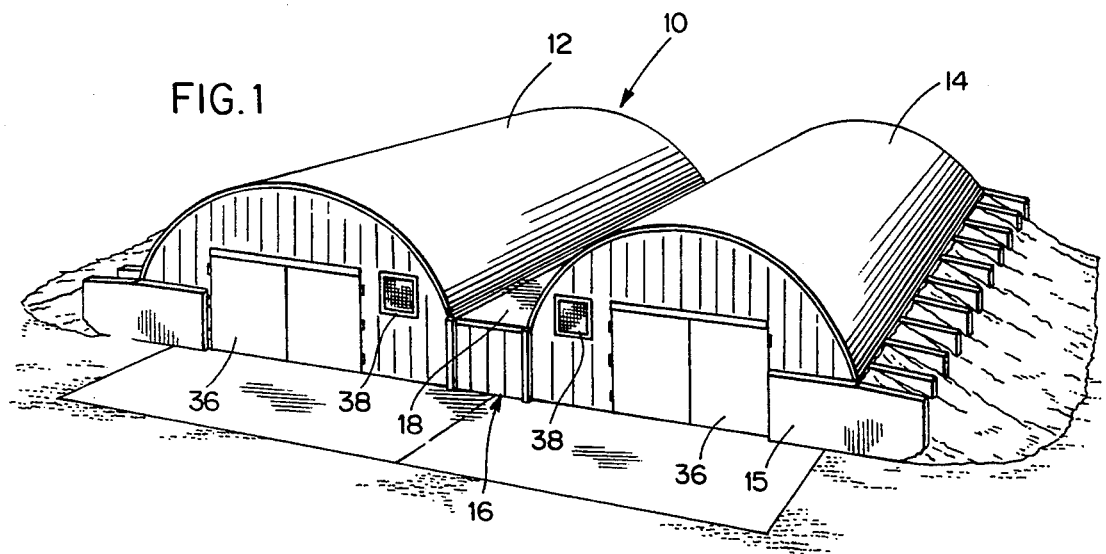
FIG. 1 is a perspective view of a double-wide curvet style building having the internal fan house of the present invention incorporated therein.
Figure 3:
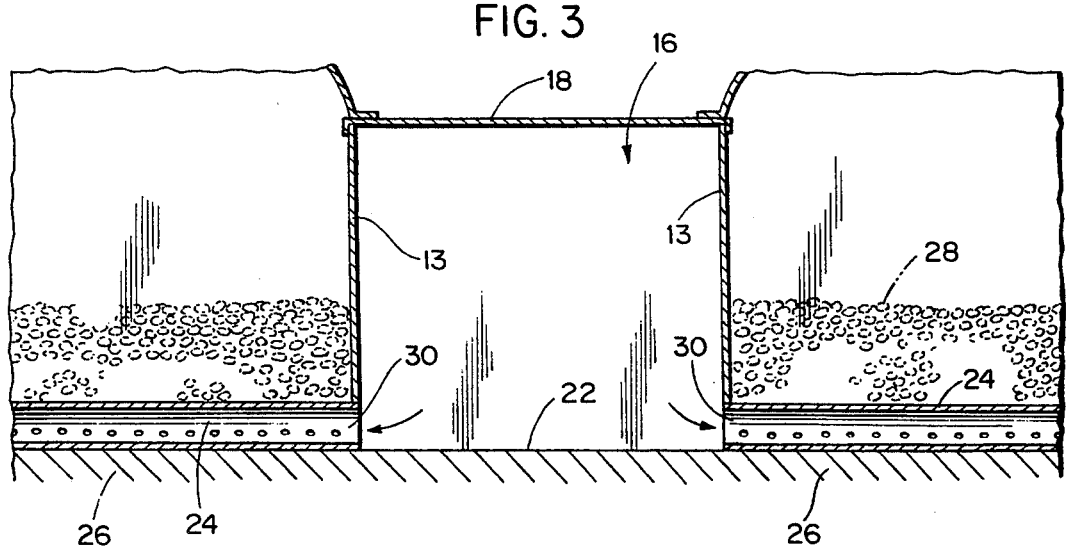
FIG. 3 is a transverse, sectional view taken along section line 3—3 on FIG. 2 illustrating structural details of the air plenum and vent pipes.
Figure 4:
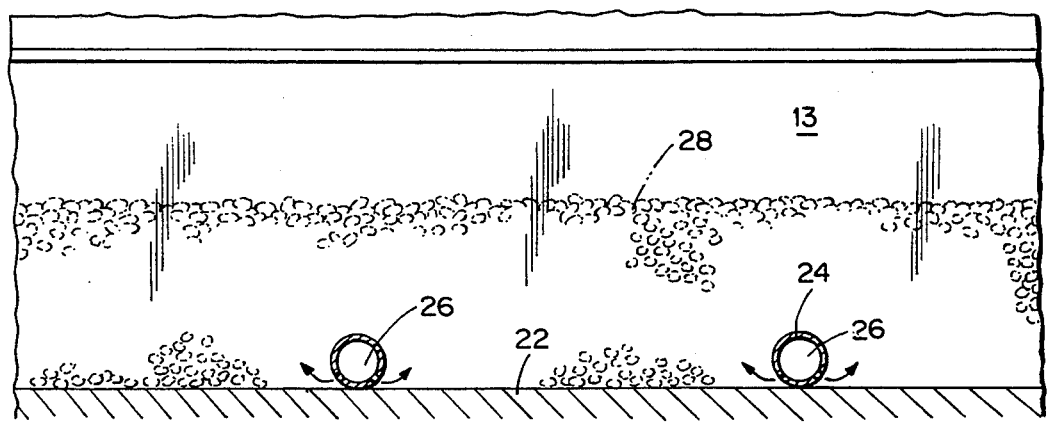
FIG. 4 is a detailed sectional view taken substantially along section line 4—4 on FIG. 2 illustrating further structural details of the vent pipes and their relationship to the stored potatoes.

FIG. 1 illustrates the construction of a double-wide or twin curvet style (Quonset) potato storage building generally designated by reference numeral 10 and which includes a pair of arcuate, generally semicircular roof structures 12 and 14. Vertical side and end stem walls 13 and 15 constructed of concrete form the bottom portion of the building 10 and support the roof structures 12 and 14. The inner stem walls 13 are spaced apart and form an air plenum generally designated by reference numeral 16 and which includes a horizontal top wall 18 connected to the stem walls 13 and 15. A floor 22 forms a support for the building 10 and a bottom for the air plenum 16. The plenum extends substantially throughout the full length of the double-wide building 10 and is in communication with a plurality of laterally extending vent pipes 24 having discharge holes 26 oriented substantially throughout the length of the vent pipes 24. The discharge holes 26 are arranged in two rows of holes approximately 45° below the horizontal center of the vent pipes and spaced from the area of engagement of the vent pipe 24 with floor 22. The vent pipes 24 extend along the upper surface of the floor and under the stored potatoes 28. Each vent pipe includes an inlet opening 30 communicating the vent pipe 24 with the positively pressurized and conditioned air in the plenum 16 for discharging conditioned air which is humidity controlled and temperature controlled into the vent pipes 24 and into the potatoes 28 for controlling the humidity and temperature of the potatoes for optimum storage conditions. One or more rows of the vent pipe 24 extend diagonally along the floor 22 to discharge the air around the fan house for distribution around the fan house area of the building.

The internal fan house incorporated into the double-wide building 10 is generally designated by reference numeral 32 and is located at the end wall 34 of the building 10 and adjacent one end of the plenum 16. The building end wall 34 has access doors 36 therein and air inlets 38 of a size to enable requisite air inlet as necessary. The fan house 32 includes a pair of diverging air passageways 39 and 40 defined by a peripheral wall or panel 41. An evaporative cell 44 is supported in each air passageway 39 and 40 and an internal panel 46 extends from panel 41 and supports a fan 48 driven by a suitable electric motor and which is located upstream from the cell 44. The portion of the fan house 32 upstream of the fan 48 is in communication with the air inlet 38 which takes in outside air. Suitable baffles or dampers may be provided for controlling the flow of air to the fan 48 with the required volume of air to circulate the required conditioned volume of air through the vent pipes 24 for discharge of the conditioned air through the discharge openings 26 into the interstices between the stored potatoes so that the conditioned air will flow upwardly through the stored potatoes for either discharge through an outside discharge vent or recycled back through the fan and evaporative cell.

Figure 2:
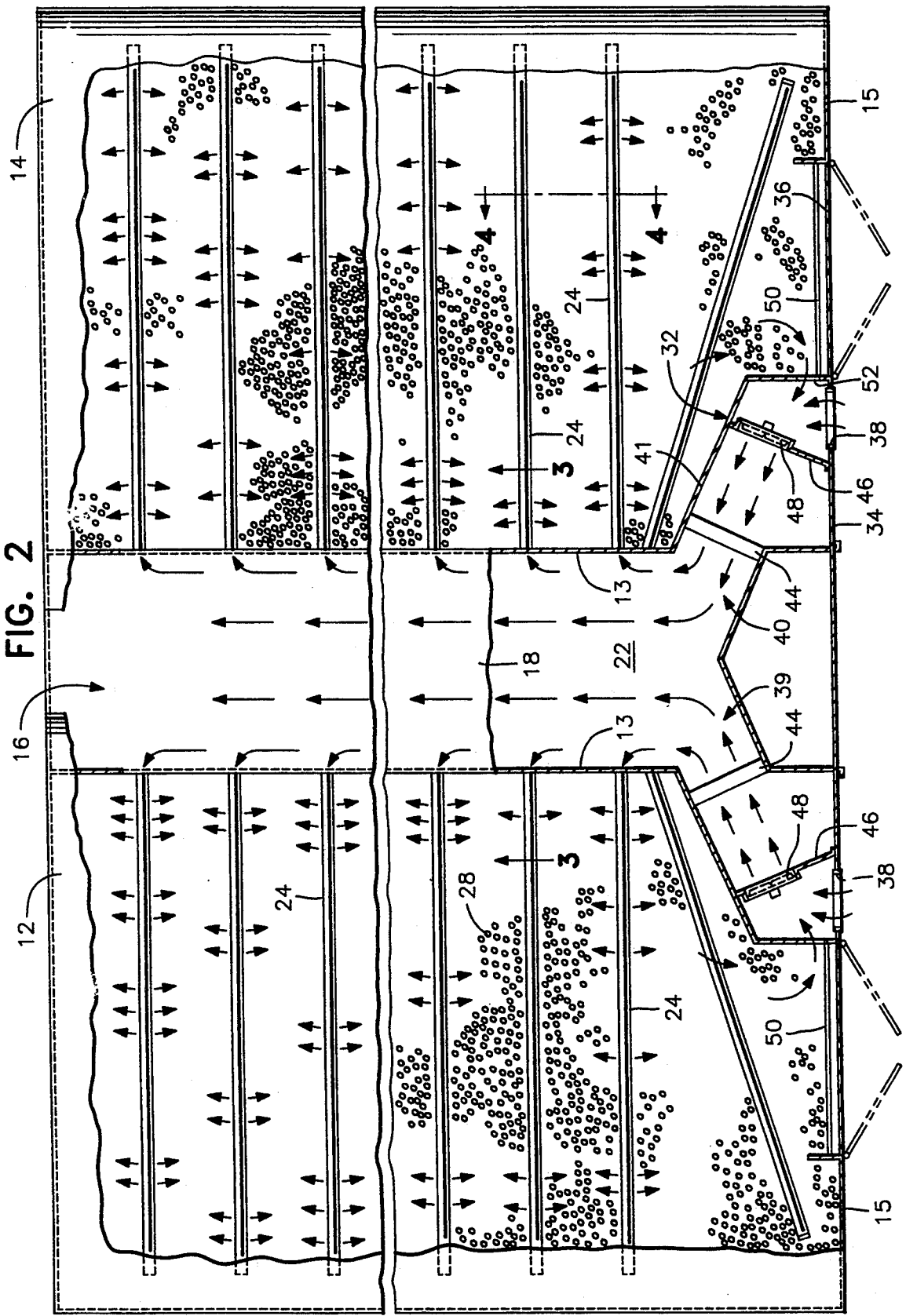
FIG. 2 is a top plan layout of the double-wide curvet style building illustrated in FIG. 1 illustrating one arrangement of an internal fan house, air plenum and vent pipes with the fan house located internally of the building and adjacent air plenum and accommodating a fan and evaporative cell.

As illustrated in FIG. 2, the vent pipe 24 adjacent the front of the building is oriented diagonally rather than parallel to the other vent pipes in order to provide air circulation to the area of the space adjacent the end wall 34 of the building. Also, internally of the access doors 34, bulkhead boards 50 are provided to retain the potatoes as they are loaded into the building with the boards being supported in a suitable manner to enable the horizontally disposed boards to be placed one on top of the other to form a vertical bulkhead which can be increased in height as the potatoes are loaded into the building. This arrangement precludes the potatoes from resting against the access doors and facilitates loading of the potatoes into the building since a vehicle may enter the building through this area when the bulkhead boards 50 are not in place.

FIGS. 5 and 6 disclose an embodiment of the invention in the form of a single curvet storage building 60 having the same general characteristics as one of the buildings illustrated in FIGS. 1–4 and which includes a floor 62, upstanding stem side walls 64 and stem end walls 66 of concrete and an arcuate roof structure 68 of corrugated metal or the like with the building including an end wall 70 having access doors 72 and an air inlet 74 which communicates with an elongated air plenum 76 having a plurality of vent pipes 78 extending laterally therefrom along the floor 62 to discharge conditioned air into the lower portion of the potatoes 80.

In this arrangement, the fan house 82 forms a portion of the air plenum and includes a peripheral wall panel 84 extending to the end wall 70 in enclosed relation to the air inlet 74 to supply air to a fan 86 and evaporative cell 88 which are supported in any suitable manner and controlled in any suitable manner to provide a supply of pressurized, temperature and moisture conditioned air to the air plenum 76 with this structure operating in the same manner as that illustrated in FIGS. 1–4 with the orientation of the fan house being such that it forms a portion of the air plenum and forms an extension thereof. As illustrated in FIG. 6, the fan house is constructed within the confines and internally of the building and adjacent air plenum.

In order to emphasize the orientation of the fan house internally of the curvet building or buildings and adjacent air plenum, the area forming the fan house is delineated in the drawings by shading to distinguish the fan house area from the remainder of the air plenum and the remainder of the curvet building or buildings thus clearly indicating the orientation of the fan house in relation to the potato storage building and adjacent air plenum.

Various building floor plans for potato storage buildings may incorporate the fan house of the present invention internally thereof with fresh air coming through the cell and fan, along the air plenum and out through the apertured vent pipes. The relationship of the fan and evaporative cell may vary depending upon the installational requirements and operation parameters with the fan either being upstream or downstream of the evaporative cell and the capacity of the evaporative cell will vary depending upon the fan capacity and the volume of potatoes being stored in order to provide adequate circulation to maintain appropriate optimum temperature and humidity conditions for the potatoes.

As indicated previously, many styles and types of potato storage buildings are being used along with various types of air circulation equipment and equipment to control the humidity and temperature of the air being circulated which includes refrigeration, humidification and additives which help to keep the potatoes dormant so they will not sprout with the biggest factor in potato storage being the control of humidity and temperature which has been greatly assisted by use of evaporative cells.

Usually, fresh air comes into the building through the use of a fan which moves through an evaporative cell and into the building and along an air plenum and out through a plurality of vent pipes which are located at the bottom of the stored potatoes. The air which is temperature and humidity controlled is circulated up through the potato pile and then either exhausted out exhaust vents or recirculated back through the evaporative cell and the fan. This circulation of conditioned air keeps the potatoes from shrinking and keeps the potatoes cool. Previously, the typical way of housing the fan and evaporative cell was to build a fan house which projected out from the front of the building which has introduced various design and engineering problems especially when constructing a fan house for use externally of a curvet (Quonset) style building.

The present invention orients the fan house internally of the curvet building and adjacent air plenum whether the plenum is within the building, between two buildings as shown in FIGS. 1–4 or alongside the outside of the stem wall 64 as shown in FIGS. 5 and 6. The fan house 32 or 82 receives the evaporative cell, fan and controls to provide a structure which is simpler and easier to design from an engineering and design standpoint and which provides a reduction in cost of the building and operation of the fan and evaporative cell thus resulting in a primary advantage of reduction in overall cost for storing potatoes and other similar produce.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A curvet building assembly for storage of potatoes comprising a pair of substantially identical storage buildings positioned in substantially parallel spaced relation, each building comprising a floor, a peripheral wall including a generally planar end wall and a roof structure forming an enclosed space for potatoes arranged in a pile, means in the peripheral wall of each building providing access to the enclosed space, an air plenum extending between said buildings, a plurality of vent pipes in each building communicated with the air plenum and extending therefrom along the building floor and a bottom portion of the potato pile, each vent pipe including a plurality of openings discharging air into the potatoes, a pair of fans and evaporative cells communicated with the air plenum for supplying temperature and humidity controlled air to the air plenum for discharge into the potatoes, a fan house for the fans and evaporative cells forming an extension of the air plenum and receiving the fans and evaporative cells therein, said fan house, fans and evaporative cells being located within the interior of the end wall to substantially eliminate external projections thereon, said floor and peripheral wall of each building defining a rectangular space and the roof structure being of arcuate transverse configuration to define curvet buildings, said air plenum extending along one side wall of each curvet building, said fan house being in communication with and forming an extension of one end of the air plenum, said fan house having two branches with each branch of the fan house including a fan and evaporative cell oriented inwardly of the respective end wall of the identical buildings, the end wall of each of the buildings including an air inlet supplying fresh air to the branches of the fan house.

2. The storage building as defined in claim 1 wherein the fan and evaporative cell in each branch of the fan house are spaced from each other, said fan being supported by a partition forming panel spaced from the evaporative cell to provide sequential air flow through the fan and evaporative cell.

3. A curvet building for storage of potatoes comprising a floor, a peripheral wall including a generally planar end wall and a roof structure forming an enclosed space for potatoes arranged in a pile, means in the peripheral wall of the building providing access to the enclosed space, an air plenum extending along a portion of the enclosed space, a plurality of vent pipes communicated with the air plenum and extending therefrom along the building floor and a bottom portion of the potato pile, each vent pipe including a plurality of openings discharging air into the potatoes, a fan and evaporative cell communicated with the air plenum for supplying temperature and humidity controlled air to the air plenum for discharge into the potatoes, a fan house for the fan and evaporative cell forming an extension of the air plenum and receiving the fan and evaporative cell therein, said fan house, fan and evaporative cell being located within the interior of the end wall to substantially eliminate external projections thereon, said floor and peripheral wall of the building defining a rectangular space and the roof structure being of arcuate transverse configuration to define a curvet building, said air plenum extending along one side wall of the curvet building, said fan house being in communication with and forming an extension of one end of the air plenum, said end wall of the building including an air inlet supplying fresh air to the fan house, said fan and evaporative cell being spaced from each other to provide flow of conditioned air to the air plenum and curvet building.

* * * * *

REEXAMINATION CERTIFICATE (4013th)

United States Patent [19]
Bagley

[11] B1 5,344,362
[45] Certificate Issued Mar. 14, 2000

[54] INTERNAL FAN HOUSE FOR CURVET BUILDING

[75] Inventor: Terrence F. Bagley, Rexburg, Id.

[73] Assignee: Teton West Construction, Inc.

Reexamination Request:
No. 90/004,831, Nov. 6, 1997

Reexamination Certificate for:
Patent No.: 5,344,362
Issued: Sep. 6, 1994
Appl. No.: 07/813,460
Filed: Dec. 26, 1991

[51] Int. Cl.⁷ ................................................. F24F 13/00
[52] U.S. Cl. ........................................... 454/180; 454/182
[58] Field of Search ................................... 454/174, 175, 454/179, 180, 181, 182

[56] References Cited

U.S. PATENT DOCUMENTS 3,915,221  10/1975  Francis .
3,921,508  11/1975  Merson .

FOREIGN PATENT DOCUMENTS 1697622  12/1991  U.S.S.R. .
2 319 832  6/1998  United Kingdom .

OTHER PUBLICATIONS

*Farmelectric Handbook No. 23, Vegetable Storage*, the Electricity Council, Warwickshire CV8 2LS, Nov. 1974, pp. 17–32, 88–102.

Raymond J. Nowak, et al., "A Census of Maine's Potato Production, Storage, and Packing Operation", Bulletin 798, Maine Agricultural Experiment Station, University of Maine at Orono, Oct. 1983.

C. Magee et al., "A Comparision of Sweet Potato Quality in Ice–Cooled Curing/Storage Facilities", Agricultural Research, Agri Engineering, Fort Valley State University, Fort Valley, Georgia 31020, 1996.

M. V. Rama et al., "Evaporative Cooling Storage of Potatoes in Two Model Storage Structures", *J. Fd. Sc. Technol.*, 1990, vol. 27, No. 1, pp. 19–21.

"Development of Dual Humidity Control and Ventilated Type Cold Shorehouses . . . ", *Selsen Nosanbutsuyo Nigen . . . No Kaihatsu*, Japan, 1993.

Tanaka Shun' Ichiro, "Development of Dual Humidity Control and . . . ", *Selsen Nosanbutsuyo Nigen . . . No Kaihatsu*, Japan, 1993.

Merle L. Esmay, "Environmental Control for Agricultural Buildings", the AVI Publishing Co., Inc., Westport, Connecticut, 1986, pp. 231–249.

Ing. N. Buitelaar, "Air Humidification during . . . " *Landbouwmechanisatie*, Jul. 6, 1981, pp. 609–613.

Lal Kushwaha et al., "Harvest and Postharvest Technologies for Fresh Fruits and Vegetables", Proc. of the Int'l Conf. on Harvest and Postharvest Technologies for Fresh Fruits and Vegetables, *ASAE*, 1995.

Kurata Yutaka, "Space, earth, and man . . . ", Reito (Refregeration), 1991, vol. 66, No. 759, pp. 23 and 24.

Roger C. Brook, "Potato Storage Design and Management", vol. 72, *American Potato Journal*, 1995, pp. 463–480.

(List continued on next page.)

*Primary Examiner*—Harold Joyce

[57] ABSTRACT

A structural arrangement in which a fan house is constructed to accommodate an evaporative cell fan and other related equipment which may be used to provide conditioned air with the fan house being oriented internally of or within the confines of a curvet potato storage building to reduce the overall cost of the building and to provide an assembly that is easier to design from an engineering standpoint than an external fan house for a curvet (Quonset) building or air plenum. The fan and evaporative cell may be arranged in various relationships to each other and with an air plenum and vent pipe arrangement with the essential arrangement being the provision of the fan house being oriented within the interior of the curvet style building.

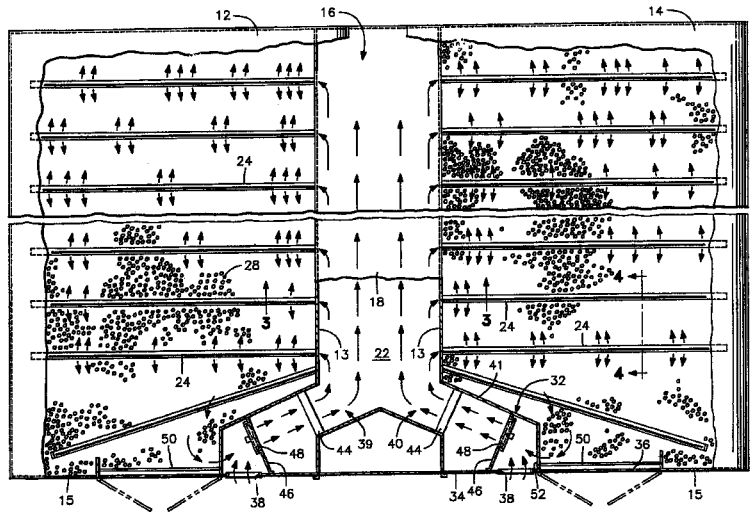

OTHER PUBLICATIONS

Von Eberhard Leppack, "Ventilation Systems for Potato Storage", *Landtechnik,* vol. 41, Section, 11, Nov. 1986, pp. 488–490.

B. F. Cargill et al., "Potato Storage Technology and Practice", *ASAE,* 1989, pp. 223–269, 285–332.

M. J. Nash, "Humidificaiton of Potatoes Ventilated . . . ", J. stored Prod, Res., Pergamon Press, 1975, vol. 11 pp. 195–201.

R. G. Chouksey, "Design of Passive Ventilated and . . . ", *Proc. ISAE SJC,* 1985, vol. 3, pp. 45–51.

Von Eberhard Leppack, "Ventilation Systems for Potato Storage", *Landtechnik,* vol. 36, Section 9, Sep. 1981, pp. 397–399.

L. A. Schaper et al., "Carbon Dioxide Accumulation . . . ", *American Potato Journal,* vol. 55, Section 1, 1978, pp. 1–15.

Todd Forbush et al., "Influence of Airflow . . . ", *American Potato Journal,* vol. 70, Section 12, 1993, pp. 869–883.

Walter C. Sparks, "Modern Storage Methods Reduce Losses", *American Vegetable Grower,* 1970.

G. F. Chapman, "Potatoes on the Farm", *Journal of Agriculture,* Feb. 1980, pp. 9–14.

Av Per Roer, "Ny Lagringsmate for Potet", *Saertrykk, Inst. for Bygnwgeteknikk,* NLH, 1982, pp. 19–22, 58.

"Trouble in store?", *Potato Business World,* 1994, pp. 15–20.

"Inside Look at Steel Storage", *Potato Grower of Idaho,* Dec., 1982, vol. 11, No. 12, pp. 14–16.

"Why The High Cost Of Today's Storage Cellars?", *Potato Grower of Idaho,* Sep., 1990, vol. 19, No. 9, pp. 8–10.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–3 is confirmed.

* * * * *